(12) United States Patent
Sweeney et al.

(10) Patent No.: US 7,356,952 B2
(45) Date of Patent: Apr. 15, 2008

(54) SYSTEM FOR COUPLING PACKAGE DISPLAYS TO REMOTE POWER SOURCE

(75) Inventors: William R. Sweeney, Richmond, VA (US); Kristen M. Totty, Richmond, VA (US); Robert J. Maher, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 910 days.

(21) Appl. No.: 10/171,753

(22) Filed: Jun. 17, 2002

(65) Prior Publication Data

US 2003/0233288 A1 Dec. 18, 2003

(51) Int. Cl.
- G09F 9/37 (2006.01)
- G09F 13/00 (2006.01)
- G06Q 30/00 (2006.01)
- A47F 69/00 (2006.01)

(52) U.S. Cl. .............. 40/446; 705/14; 40/427; 40/541; 40/463; 206/573

(58) Field of Classification Search .......... 705/28, 705/22, 23, 27; 345/52
See application file for complete search history.

(56) References Cited

U.S. PATENT DOCUMENTS

| | | |
|---|---|---|
| 4,002,886 A | 1/1977 | Sundelin |
| 4,339,668 A | 7/1982 | Mueller et al. |
| 4,390,877 A | 6/1983 | Curran |
| 4,500,880 A | 2/1985 | Gomersall et al. |
| 4,766,295 A | 8/1988 | Davis et al. |
| 4,841,329 A | 6/1989 | Kasamura et al. |
| 4,841,429 A | 6/1989 | McClanahan et al. |
| 4,888,709 A | 12/1989 | Revesz et al. |
| 4,942,352 A | 7/1990 | Sano |
| 5,111,196 A | 5/1992 | Hunt |
| 5,198,644 A | 3/1993 | Pfeiffer et al. |
| 5,243,504 A * | 9/1993 | Sejzer .................. 362/154 |
| 5,455,466 A | 10/1995 | Parks et al. |
| 5,510,602 A | 4/1996 | Evans et al. |
| 5,537,126 A * | 7/1996 | Kayser et al. ......... 345/2.1 |
| 5,544,041 A | 8/1996 | Nekomoto |
| 5,583,525 A | 12/1996 | Nekomoto et al. |
| 5,734,254 A | 3/1998 | Stephens |
| 5,870,067 A | 2/1999 | Smith |
| 6,040,680 A | 3/2000 | Toya et al. |
| 6,057,668 A | 5/2000 | Chao |

(Continued)

FOREIGN PATENT DOCUMENTS

WO    WO 2005/034585 A1 *    4/2005

(Continued)

Primary Examiner—F. Ryan Zeender
Assistant Examiner—Ramsey Refai
(74) Attorney, Agent, or Firm—Buchanan Ingersoll & Rooney PC

(57) ABSTRACT

A merchandising system having a power distribution device associated with a package support system, and a package having a sensory output such as an image display capable of using power, data and/or signals provided from the power distribution device to produce a desired output when the package is associated with the package support system. Packaging materials of the package form the coupling medium for contactless coupling such as capacitive coupling of a controlled signal provided to the package support system to a display on the package.

15 Claims, 13 Drawing Sheets

U.S. PATENT DOCUMENTS

| | | |
|---|---|---|
| 6,118,426 A | 9/2000 | Albert et al. |
| 6,122,415 A * | 9/2000 | Blake .......................... 385/12 |
| 6,154,005 A | 11/2000 | Hyogo et al. |
| 6,166,816 A * | 12/2000 | Blake .......................... 356/478 |
| 6,172,608 B1 | 1/2001 | Cole |
| 6,177,921 B1 | 1/2001 | Comiskey et al. |
| 2003/0015787 A1 * | 1/2003 | Geissinger et al. ......... 257/692 |
| 2003/0227384 A1 * | 12/2003 | Sweeney et al. ............ 340/540 |
| 2004/0136171 A1 * | 7/2004 | Patton et al. ................. 362/31 |
| 2007/0022644 A1 * | 2/2007 | Lynch et al. ................. 40/446 |
| 2007/0042614 A1 * | 2/2007 | Marmaropoulos et al. .... 439/37 |
| 2007/0138923 A1 * | 6/2007 | Sokola ..................... 312/223.5 |

FOREIGN PATENT DOCUMENTS

WO    WO 2005034585 A1 *   4/2005

* cited by examiner

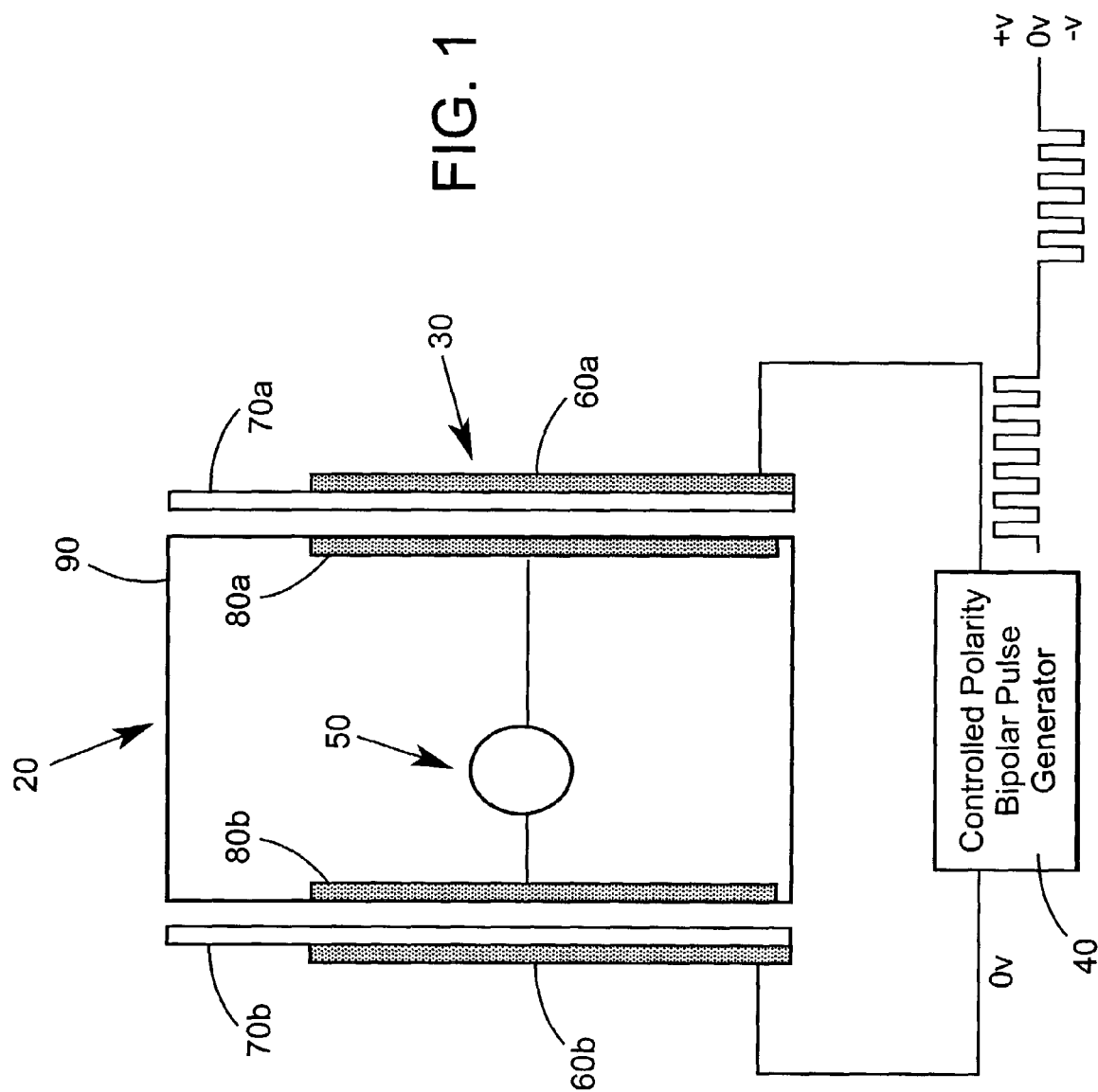

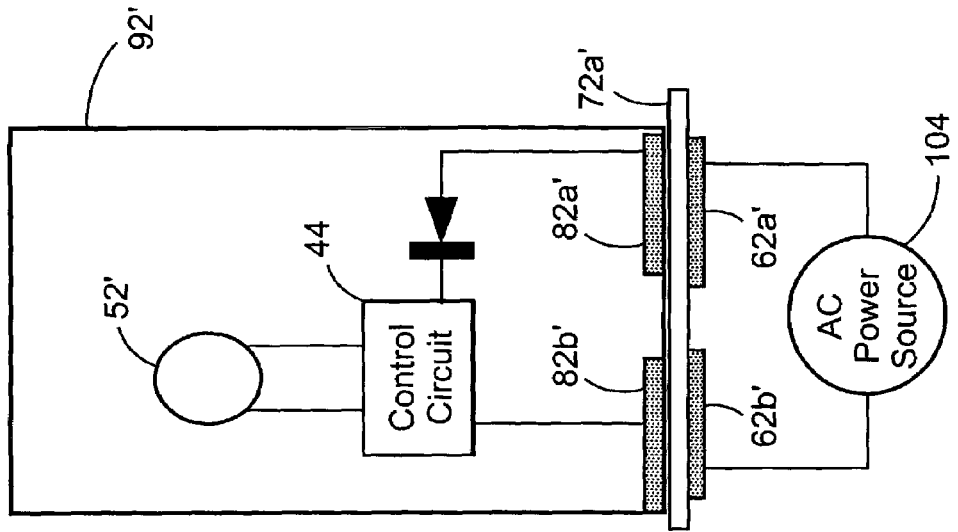
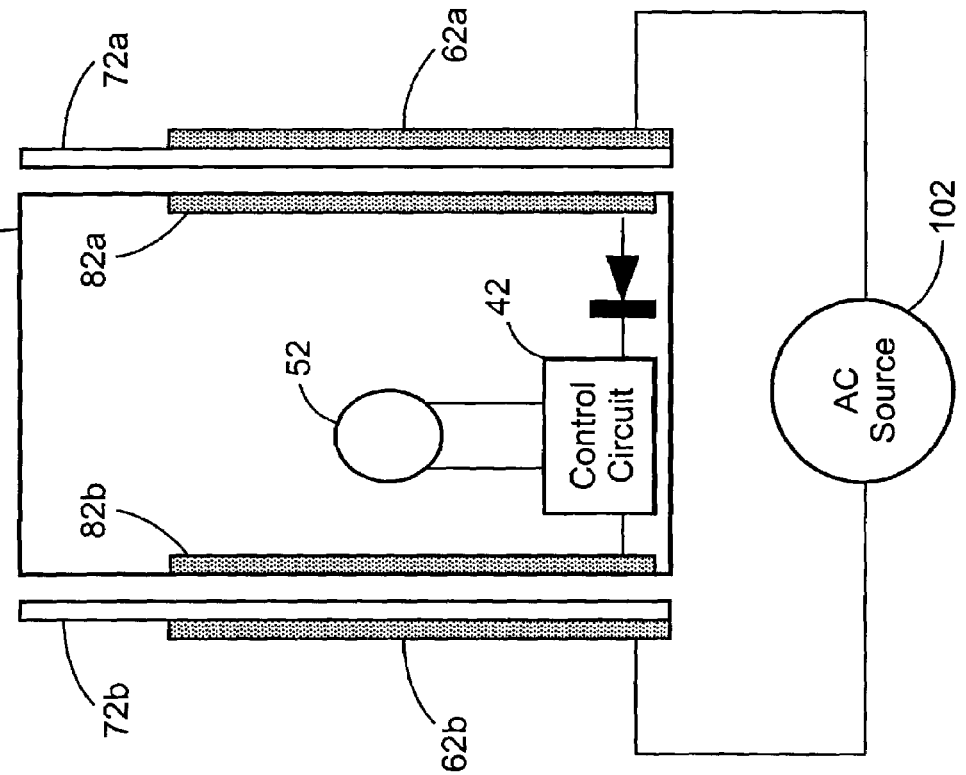

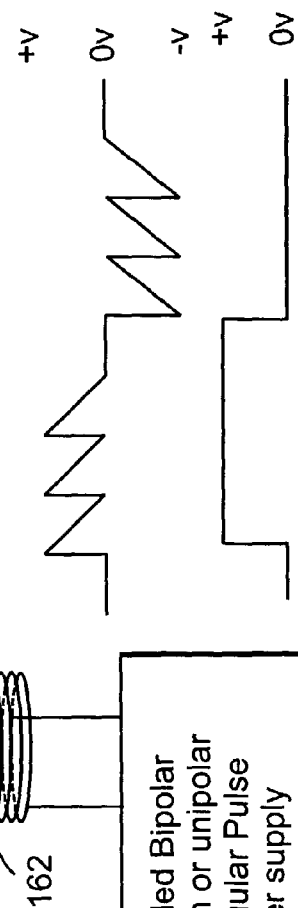
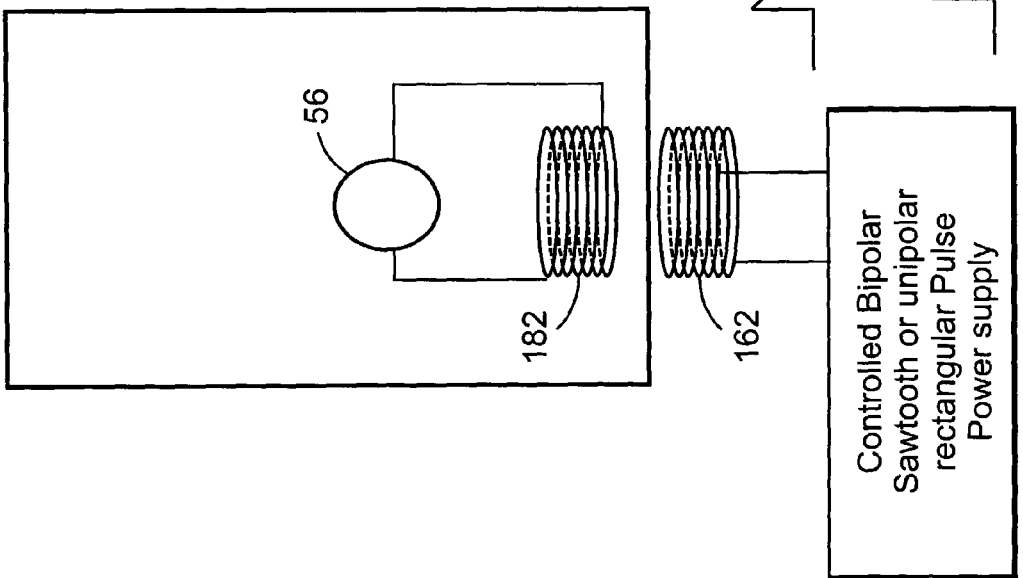
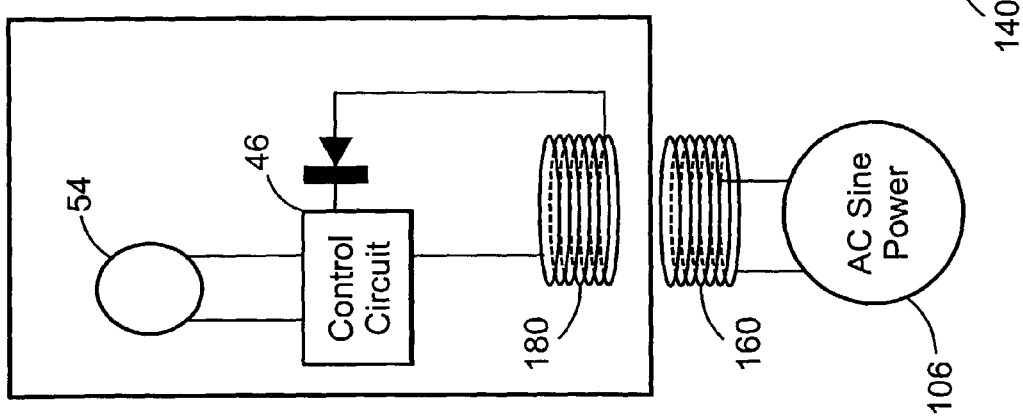

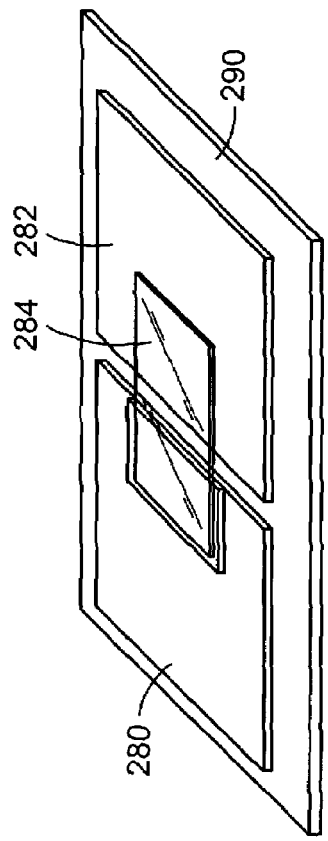
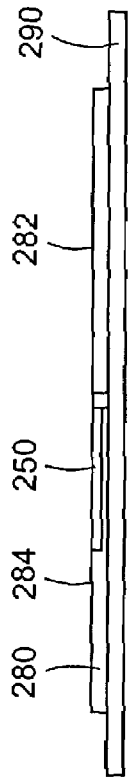
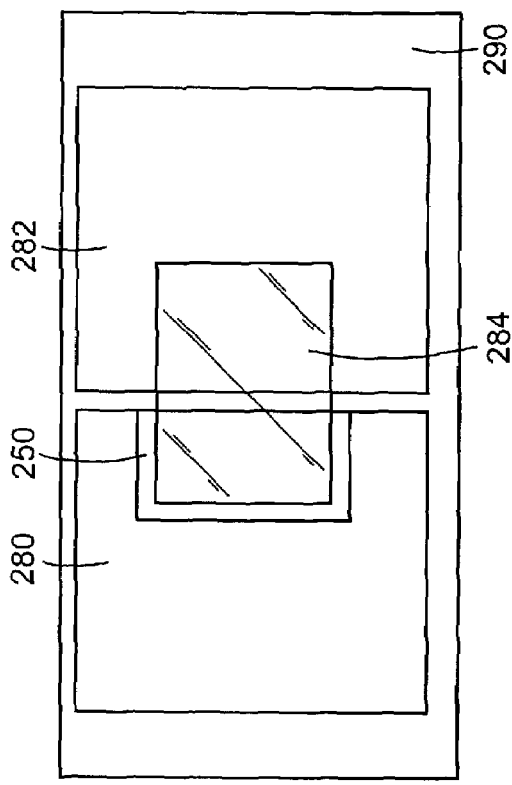
FIG. 10A
FIG. 10B
FIG. 10C

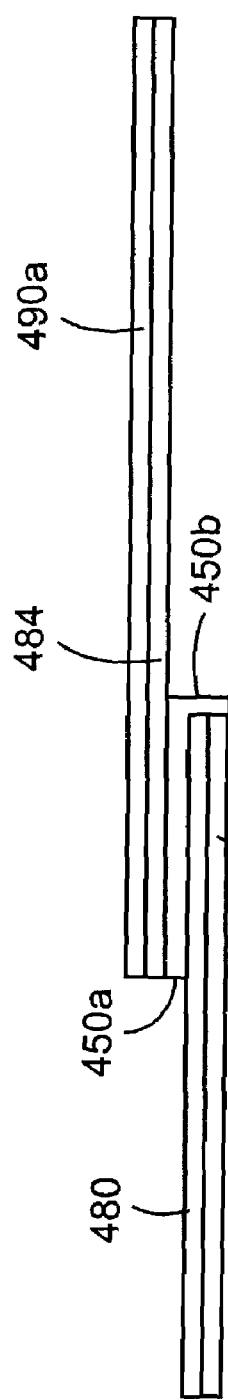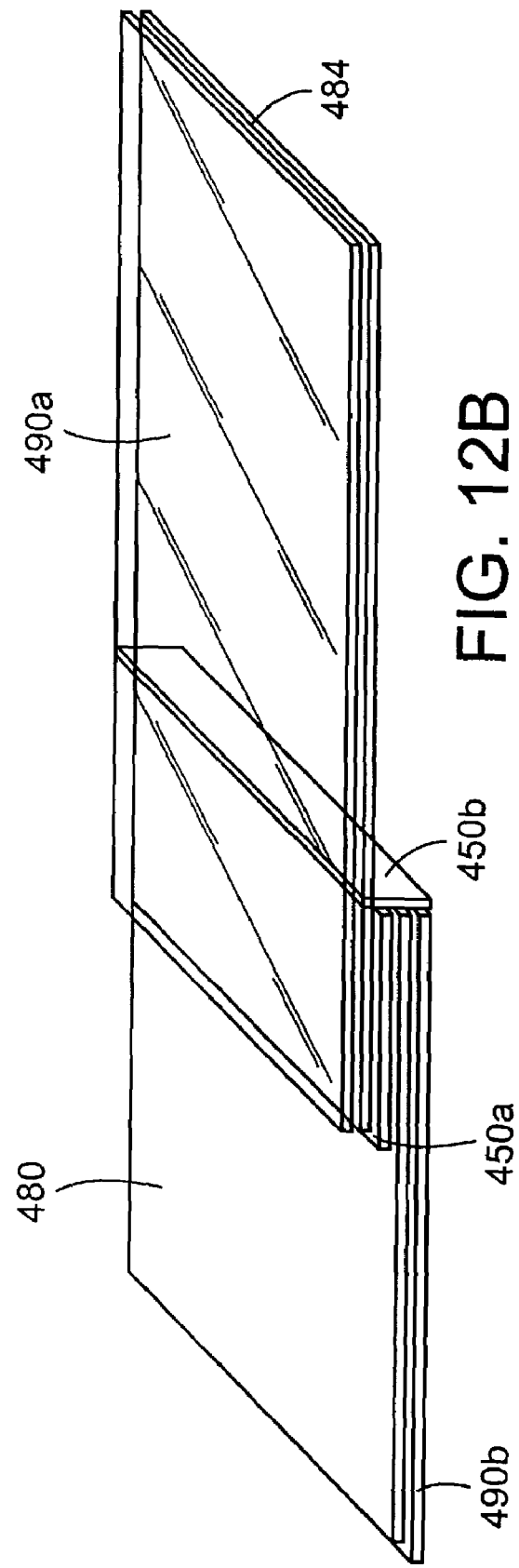

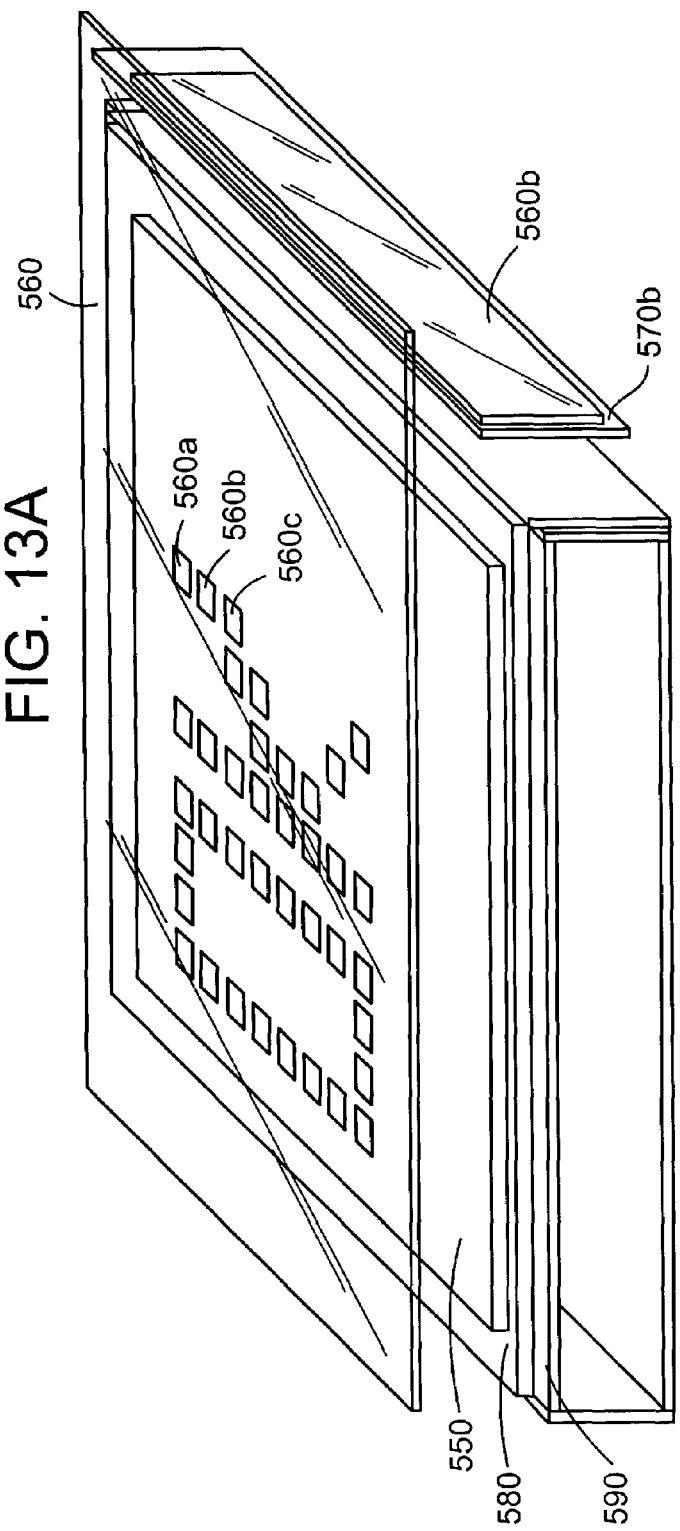
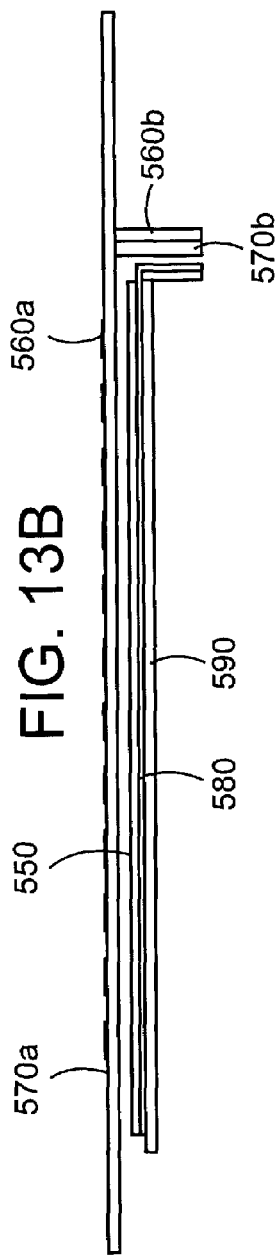

SYSTEM FOR COUPLING PACKAGE DISPLAYS TO REMOTE POWER SOURCE

This invention relates to improvements in on-package displays that can be used for advertising or entertainment purposes. More particularly, a system according to the invention can include a power or signal distribution device that is provided on a support for packages, and at least one package including a sensory display that can receive power or signals affecting the display output when the package is placed on the support.

BACKGROUND OF THE INVENTION

It is known to provide electronic labels on the front edges of shelves in grocery stores to replace traditional paper labels for the purpose of conveying pricing information to a perspective customer. The electronic labels can include a microprocessor that is connected to control a display on a display panel on the electronic label. The electronic labels can include capacitor plates that are positioned in close, non-contact relation with a conductor that extends along the edge of the shelf and is connected through a data distribution network to a central data transmission source. The existing systems allow pricing information on the shelves to be readily modified from a central control station that may be located in an office in the store. Existing electronic labels are adapted to be mounted in association with goods, objects, etc. . . . placed on the shelves to convey pricing information about the goods, objects, etc, but do not provide a means for drawing attention of consumers to the actual products themselves. Such shelf-mounted labels also can convey information only when they are in position on the shelves.

With advances in electronic display technology, it would be desirable to provide on-package electronic promotional information. Such on-package electronic displays could display varied sensory output powered by the package itself. Because of the variations in package distribution and shelf storage times common in retail consumer package goods, the costs associated with providing the necessary power and control electronics in each package where an active on-package promotion is desired could make the use of such active promotions impractical. Accordingly, a system for coupling on-package electronic displays to remote power would be highly desirable for powering the displays while the packages are positioned to attract the attention of consumers with the electronic displays.

SUMMARY OF THE INVENTION

A merchandising system is provided that includes a power and/or data distribution device associated with a package support system, and a package having a sensory output means such as an image display capable of using power and/or data provided from the power and/or data distribution device to produce a desired output when the package is associated with the package support system. The sensory output means on the package could include video or audio outputs such as flashing lights or other attention-getting or entertaining displays.

In one embodiment of the invention, the package or at least portions thereof actually couples an electric field received from the power and/or data distribution device associated with the package support system to direct the electric field across an electric field sensitive display on the package. In this embodiment, the necessary power and/or data to produce the sensory output can be obtained from a power distribution device that is external to the package and then conveyed to the sensory output means through a contactless coupling such as a capacitive coupling. One or more packaging materials of the package can be electrically connected to the sensory output means and act as a coupling medium for contactless coupling of the sensory output means with the power and/or data distribution device when the package is placed on the package support system. Alternatively, conductive materials to couple the on-package display to the remote power distribution device can be applied to an already complete package. The package support system for an individual package or plurality of packages, such as a shelf or a rack, includes at least a portion of the power distribution device, thereby creating an electric field or signal source in the vicinity of a package on the support. The package couples the electric field from the package support to the sensory output means, such as an electrophoretic display on the package.

A merchandising system according to one embodiment of the invention allows the appearance of each package to be customized at the point of sale, and allows for the control of package functions prior to sale through a remotely controlled system. The remote control system can be designed to coordinate actions or messages across a group of packages placed on a shelf. Electrodes on the shelf could be multiplexed together to control a mosaic of displays on multiple packages. This arrangement would allow retailers to actually use the packages themselves for additional controlled advertising space in situations where there is limited frontage display. The shelf or other package support system provides power, data and/or other controlled signals to the packages, preferably through a contactless coupling such as a capacitive coupling, and can power various on-box functions including but not limited to displays, sound generators, light emitters, smell emitters, sensors or mechanical motion actuators. The power and/or data distribution device included on the shelf can provide a controlled polarity bipolar pulse that is coupled to the on-package display or other sensory output through coupling mediums that can form part of the package.

DESCRIPTION OF THE DRAWINGS

FIG. 1 illustrates a capacitively powered package display with on-shelf control.

FIG. 2A illustrates a capacitively powered package with on-package control.

FIG. 2B illustrates a capacitively powered package with on-package control as in FIG. 2A, with shelf electrodes positioned below the package.

FIG. 3A illustrates an inductively powered package with on-package control.

FIG. 3B illustrates an inductively powered package with on-shelf control.

FIGS. 10A-C illustrate another embodiment of a combined display/power coupling electrode design.

FIGS. 12A and 12B illustrate still another embodiment of a combined display/power coupling electrode design.

FIGS. 13A and 13B illustrate a further embodiment of a combined display/power coupling with high resolution electrode design using an active matrix display.

DESCRIPTION OF PREFERRED EMBODIMENTS

Figure 4:
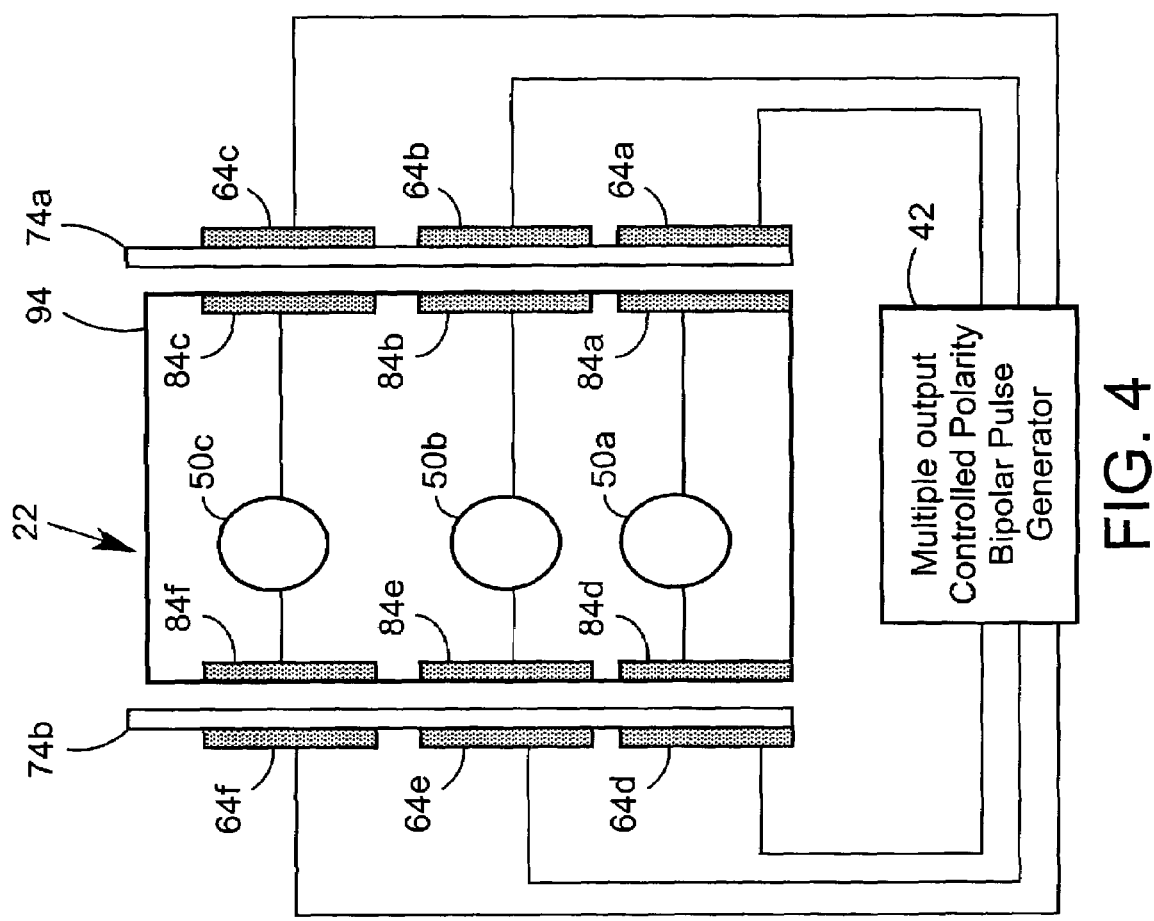
FIG. 4 illustrates an embodiment having a capacitively powered multi-segment display with on-shelf control.

A system for coupling package displays to remote power sources can use electrodes or other electrically conductive medium arranged on any of a variety of package support systems to create an electric field in the vicinity of the electrodes. A package is then provided with an electronic display that can include electric field sensitive materials, and the package itself serves to couple the electronic display to the electric field created at the package support when the package is on the support. The electronic display can be either separate from and electrically connected to, or otherwise combined with electrodes or other electrically conductive medium on the package in an arrangement that allows for contactless coupling of the electric field created at the package support system with the electronic display. One or more packaging materials can be used as at least one of the electrodes, or the electrodes can be formed on an already complete package.

A merchandising system according to a first embodiment of the invention can include a power, data and/or signal distribution device associated with a package support system, where the power, data and/or signal distribution device can include a controlled polarity bipolar pulse generator 40, such as shown in FIG. 1. The bipolar pulse signal provided by the pulse generator is just one example of any number of different controlled signals that can be supplied to a plurality of conductive plates that form electrodes on a package support system. A bipolar pulse is illustrated in FIG. 1. The voltage in the bipolar pulse alternates as in an alternating current signal, and can follow a step pattern as shown in FIG. 1 with the polarity of the signal switching from positive to negative. Electrodes 60a, 60b can be positioned in a vertical arrangement on the package support system, such as shown in FIG. 1, or in any other desired arrangement that would place them in proximity to the packages to be placed on the package support system.

The control for the power, data and/or signal distribution device can be provided on the shelf as shown in FIG. 1, or alternatively can be provided on the package itself, as shown in FIGS. 2A and 2B. The change in polarity of the signals provided to the electrodes on the package support system is just one example of the way in which power or data can be controlled as it is provided to the power distribution system on the package support, or as it is controlled on the package itself. The more expensive control electronics can be located on the package support system if it is desired to reduce the costs associated with the package itself. The coupling of power from a power distribution device on the package support system to the package can also enable recharging of—or limit the discharging of on-package batteries used for applications such as on-package electronic games or other entertaining displays used by a consumer after purchase of the package.

A display provided on the package can include a polarity sensitive display 50, such as shown in FIG. 1. Electric field sensitive materials such as electrophoretic materials can be provided on at least a portion of the package, and electrically connected to conductive plates 80a, 80b that form electrodes on the package. Examples of electrophoretic materials are described in U.S. Pat. No. 6,118,426, which is herein incorporated by reference. Electrodes 80a, 80b can be positioned in proximity to electrodes 60a, 60b on the package support system when the package 20 is placed on the package support system 30. An example of an electrophoretic display is shown in U.S. Pat. No. 6,118,426, which is herein incorporated in its entirety by reference. The electrophoretic materials can be encapsulated, with the display being formed by printing or coating a surface with the capsules. The capsules can contain particles such as pigments, with the particles being dispersed in a suspending fluid. Optical qualities of the electrophoretic materials can be modulated responsive to signals such as a bipolar pulse or other fluctuating electrical or electromagnetic signal.

The package 20 serves to couple the electric field produced by the electrodes 60a, 60b on the package support system (hereinafter referred to in a non-limiting manner as a shelf) from the shelf electrodes to the display 50 on the package. In the embodiment shown in FIG. 1, insulators 70a, 70b are provided to the outside of electrodes 60a, 60b in order to prevent any undesired shorting of the electrodes. Various insulating materials that can be transparent, translucent or opaque can be applied over the electrodes using known processes such as coating or lamination. The electrodes 80a, 80b on the package 20 can be formed by electrically conductive laminates, foils or other materials, including the packaging materials themselves. As an example, the foil liner for the package, which also serves as a means for preserving the freshness of the contents of the package, can be divided into two electrodes 80a, 80b, with each of the portions of the foil liner being insulated from each other to form the two separate electrodes. This can be achieved without affecting the integrity of the foil liner by various means such as scoring the conductive foil layer of the liner to create electrically separated portions, or applying the electrically conductive layer over separated portions of the liner with insulating material in between the portions.

When a voltage is applied to the electrodes 60a, 60b on the shelf or other package support system or merchandiser, such as represented by a bipolar pulse produced by generator 40 as illustrated in FIG. 1, and the package 20 is placed in position on the shelf with electrodes 80a, 80b adjacent shelf electrodes 60a, 60b, respectively, a first capacitor is formed by electrodes 60a and 80a as separated by insulators 70a and a portion of insulator 90. Similarly, a second capacitor is formed by electrodes 60b and 80b separated by insulators 80b and another portion of insulator 90. As a result, the controlled signal provided to the shelf is capacitively coupled to the package and transmitted to a polarity sensitive display 50, which can be formed on the package using electric field sensitive materials such as electrophoretic materials. While the embodiment shown in FIG. 1 shows the polarity sensitive display 50 as separate from and electrically connected to the electrodes 80a, 80b, in alternative embodiments such as shown in FIGS. 9A-13B, the display can be combined with the power coupling on the package. Furthermore, while the electrodes 60a, 60b on the package support system are shown arranged in a vertical orientation in the embodiment of FIG. 1, alternative embodiments such as those shown in FIG. 8 can arrange the package support system electrodes horizontally below a package, in front of and behind a package, and other alternatives.

The capacitive couplings for transferring desired controlled signals from the package support system to the package are formed when the package is placed on the package support system with electrodes oriented in proximity to corresponding electrodes on the support system. The thickness of the insulators such as the package insulator 90 and the shelf insulators 70a, 70b, as well as the spacing between the shelf electrodes and the package electrodes, affects the amount of voltage that must be provided to achieve the desired signal coupling and driving of the polarity sensitive display. In a preferred embodiment the voltage provided can range between 24 and 200 volts. The display 50 in FIG. 1 can actually form a third capacitor as the electrophoretic materials are generally captured between two electrodes that create the electric field for affecting the properties of the electrophoretic materials.

In an alternative embodiment as shown in FIG. 4, a multi-segment display made up of separate display segments 50a, 50b and 50c can be formed on the package 22 to achieve a desired image or advertising results. The display segments 50a, 50b and 50c are electrically connected to corresponding package electrodes 84a, 84b, 84c, 84d, 84e, and 84f. As discussed above, the package electrodes can be formed as portions of a foil liner or other packaging material, or they can be formed independently from the packaging materials such as via application of a conductive material on a completed package. The package electrodes are generally covered with an insulator 94, which can be formed by the outer cardboard or paperboard of the package or through other means such as the application of an insulating film. In the embodiment shown in FIG. 4, conductive plates or electrodes 64a, 64b, 64c, 64d, 64e, and 64f are arranged such that they will each adjoin corresponding electrodes in the package when the package is placed on the package support.

Each of the package support system electrodes is connected to a multiple output, controlled polarity, bipolar pulse generator 42, which can provide controlled signals to the package support system electrodes. When the package 22 is placed on the package support system as shown in FIG. 4, each of the corresponding pairs of package support system electrodes and package electrodes becomes capacitively coupled and the controlled signals are conveyed to the associated display segments.

A variety of conductive materials can be used to form the electrodes on both the package support system and the packages themselves. In addition to conventional metal foils, the conductive plates forming electrodes on both the package support systems and the packages themselves can be formed from transparent materials such as Indium Tin Oxide (ITO). Additionally, semi-conductor technology could be used in the formation of the electrodes, with electrodes being formed by doping various semiconductor substrates with different impurities.

Figure 5:
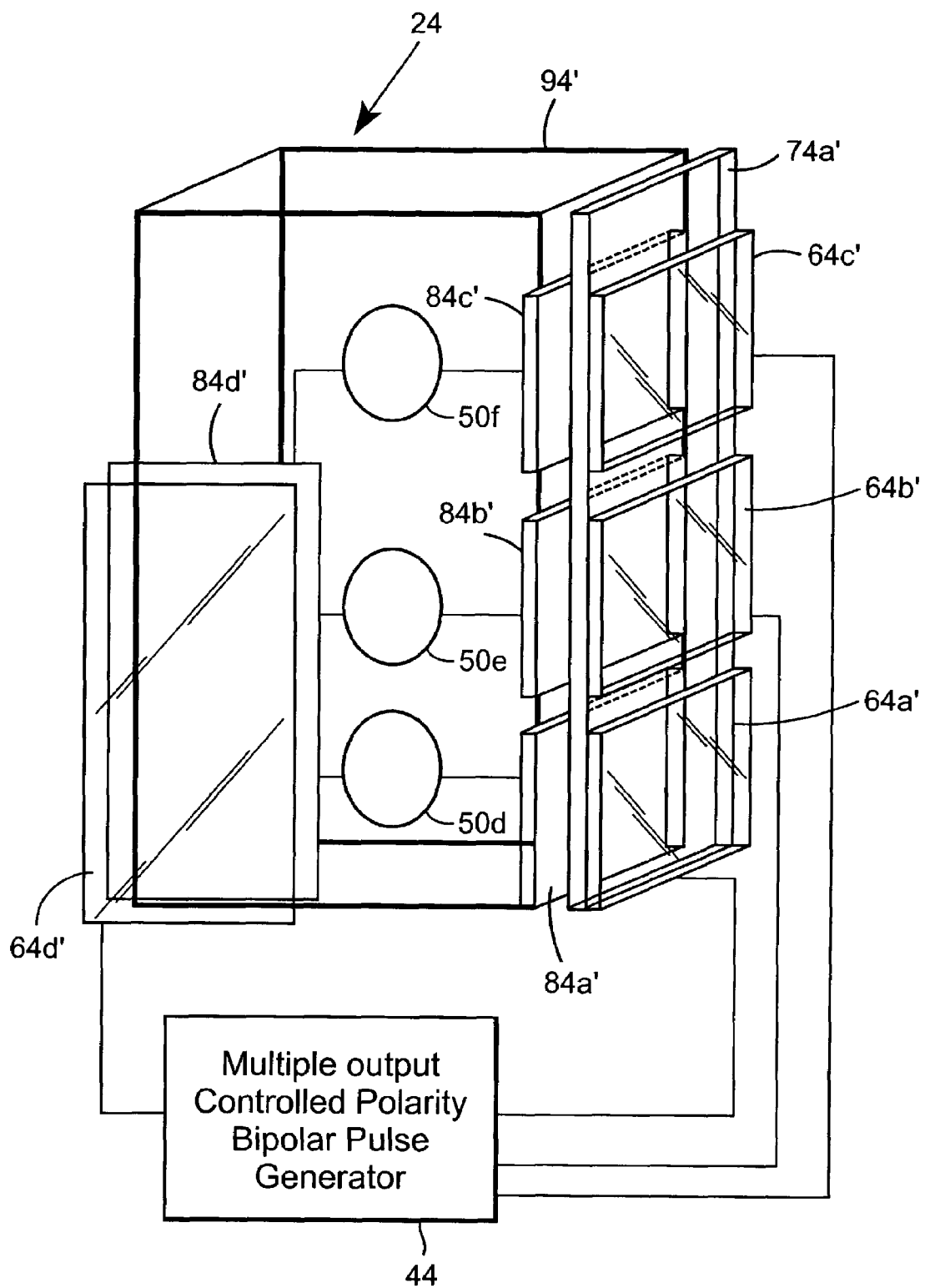
FIG. 5 illustrates another embodiment having a capacitively powered multi-segment display with on-shelf control.

In the embodiment shown in FIG. 5, a multi-segment display is again formed on a package 24 from display segments 50d, 50e, 50f. These display segments are electrically connected to package electrodes 84a', 84b', 84c' and 84d'. In the embodiment shown in FIG. 5, package electrode 84d' is connected to all three display segments, with each display segment also being connected to separate package electrodes 84a', 84b' and 84c'. The shelf or other package support system again includes multiple electrodes 64a', 64b', 64c', and 64d'. These electrodes can be formed from transparent conductive materials such as ITO so that a package 24 can be placed behind the package support system with the multi-segment display still being visible. Although not shown in FIG. 5, the conductive plates or electrodes are generally sandwiched in between insulating materials, which can also be formed from transparent materials. A multiple output, controlled polarity, bipolar pulse generator 44 transmits the desired control signals to each of the package support system electrodes in order to control the display on the segmented display.

Figure 6:
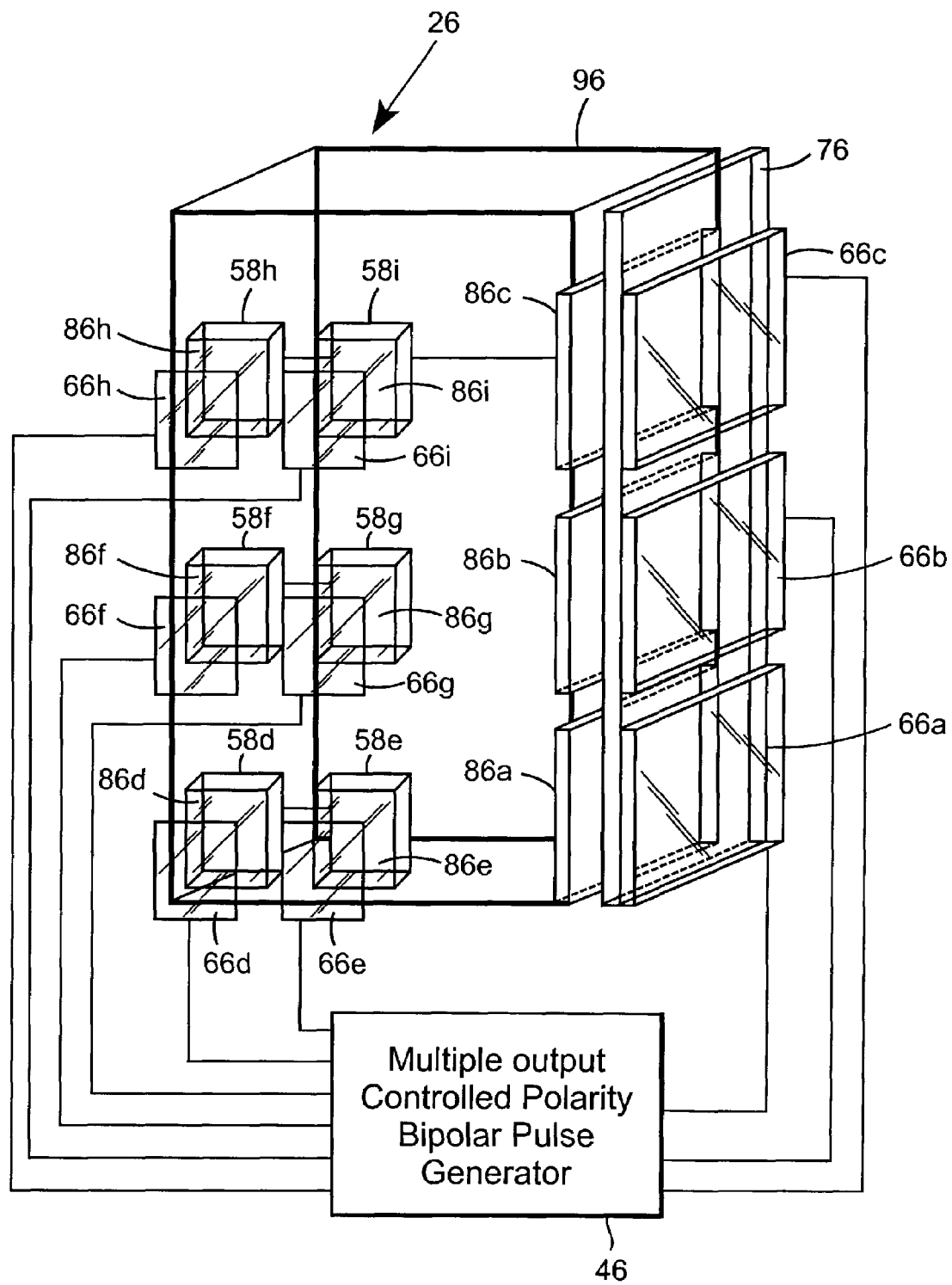
FIG. 6 illustrates yet another embodiment having a capacitively powered multi-segment display with on-shelf control.

In yet another embodiment, as shown in FIG. 6, the display can be formed from multiple segments 58d-58i, which are each electrically connected to corresponding package electrodes 86a-86i. The multi-segmented display is again driven by transparent electrodes arranged in an array on a merchandiser, which forms part of the package support, with each of the transparent electrodes 66a-66i being individually connected to the multiple output, controlled polarity, bipolar pulse generator 46. Capacitive couplings are formed between package electrodes 86a-86c and corresponding package support system electrodes 66a-66c as well between each of the package electrodes 86d-86i and corresponding package support system electrodes 66d-66i.

Figure 7:
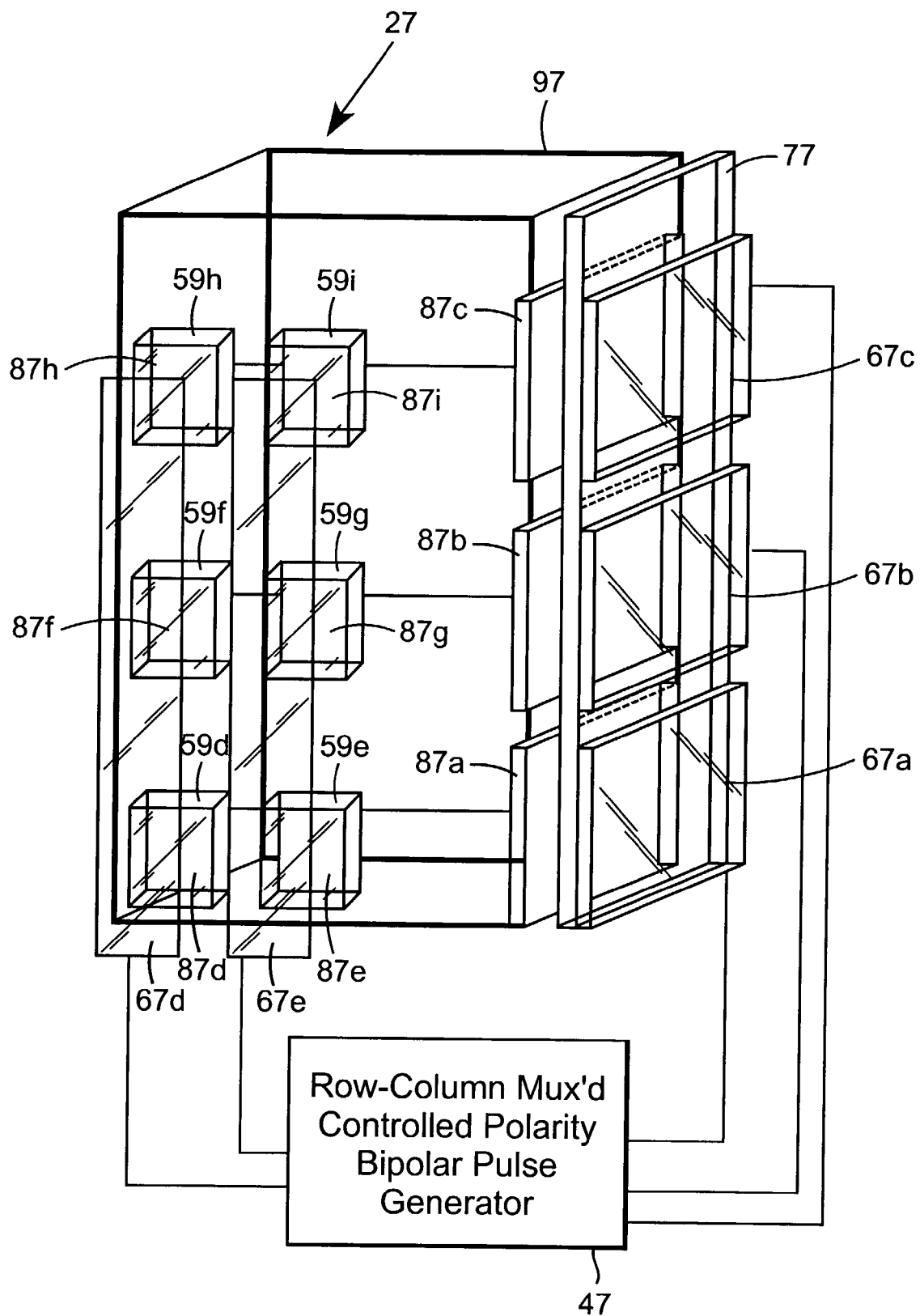
FIG. 7 illustrates a capacitively powered multi-segment display with on-shelf multiplexed control.

FIG. 7 Illustrates an embodiment similar to that shown in FIG. 6, with the exception that package electrodes (not shown—refer to package electrodes 86d-86i in FIG. 6) are capacitively coupled to only two elongated package support system electrodes 67d, 67e in a multiplexed array. In the embodiment shown in FIG. 7, the display formed by multi-segment display elements 59d-59i is controlled by the pulse generator 47 with the separate rows of display segments being multiplexed together.

While the embodiments shown in FIGS. 1-7 provide the display or the display segments on each package separate from and electrically connected to the package electrodes, the display segments can also be combined with the power couplings as shown in FIGS. 9A-13B. The package electrodes can be formed using packaging material such as foil or metalized paper, or they can be formed independent from the packaging materials on the package through the application of conductive materials.

Figure 9A:
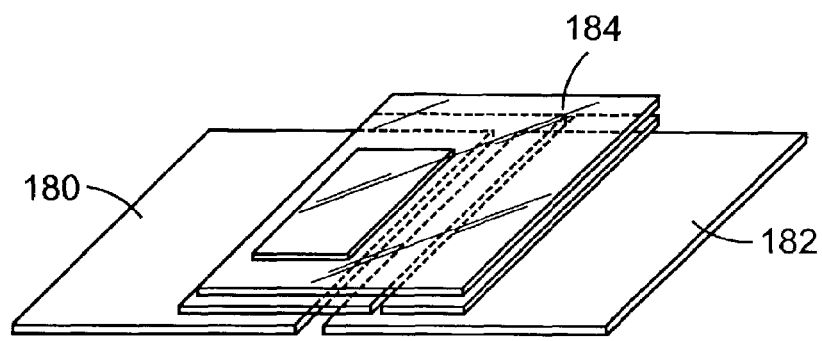
FIGS. 9A-C illustrate an embodiment of a combined display/power coupling electrode design.
Figure 9B:
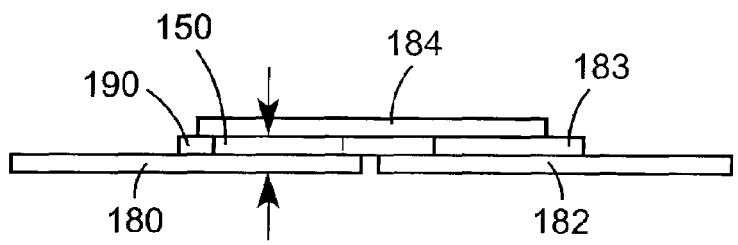
Figure 9C:
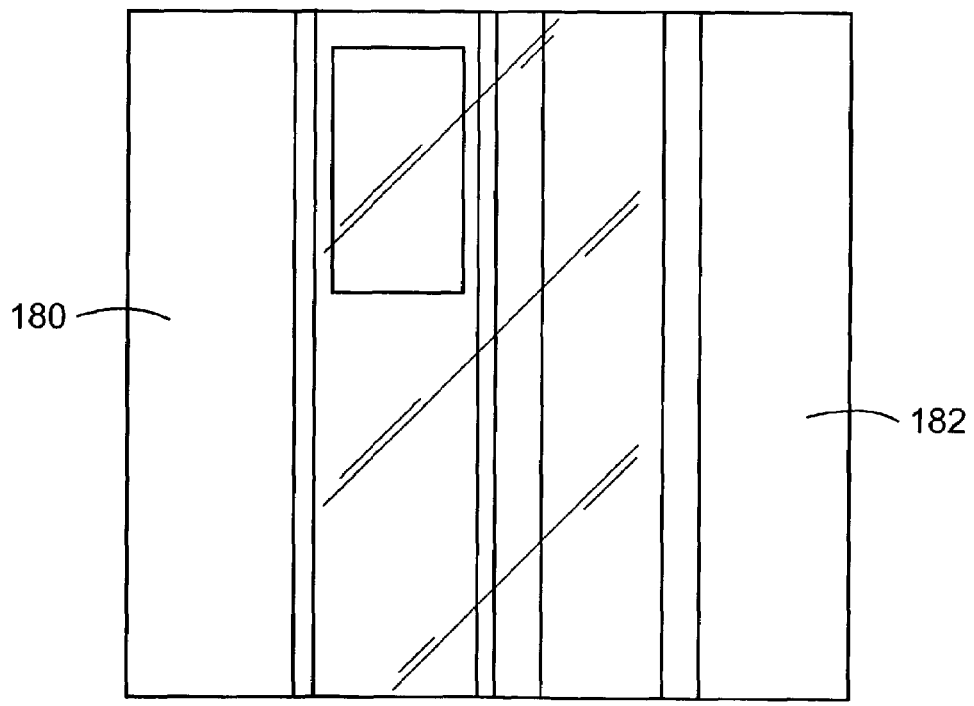

In the embodiment shown in FIGS. 9A-9C, a capacitive coupling is provided to an electrophoretic display 150 using first and second electrodes, with a first electrode 180 formed from foil or metalized paper and a second electrode 182 being connected through an optional conducting spacer 183 to a transparent conductor 184. The conducting spacer 183 is optional because the transparent conductor 184 can be made from a flexible material such as foil or a conductive polymer, and can be conformed to make contact with second electrode 182. The transparent electrode 184 is separated from the first and second electrodes 180, 182 by an insulating spacer 190. The paper or foil forming the electrodes can be folded with an additional insulating seam or break in the conductive coating or laminate to form a cup or box such as that found in cigarette packages, cartons or cereal boxes. In the combined display/power coupling of this embodiment, an electric field generated at the package support system would be coupled directly to the display through the capacitive couplings formed between electrodes 180, 182 and corresponding electrodes in adjoining relationship on the package support system. Although the electrodes and transparent conductor 184 produce an electric field that is perpendicular to the electrophoretic display 150, other electrophoretic materials or electric field sensitive materials could be used that would respond to a parallel or skewed electric field, such as produced by interdigitated electrodes or electrodes in other arrangements.

Another embodiment of a combined display/power coupling electrode design is shown in FIGS. 10A-10C. First electrode 280 and second electrode 282 are formed by metalized or conductive coatings applied over an insulating substrate 290. In the embodiment shown in FIGS. 10A-10C the capacitive coupling to an electrophoretic display 250 is formed by the electrical connection from the second electrode 282 through a transparent flexible conductor 284 and through the electrophoretic display 250 to the first electrode 280. The insulating substrate 290 on which the first and second electrodes are formed could be the outer cardboard or paperboard material of the package itself, or could be applied as a laminate or coating to a completed package.

Figure 11A:
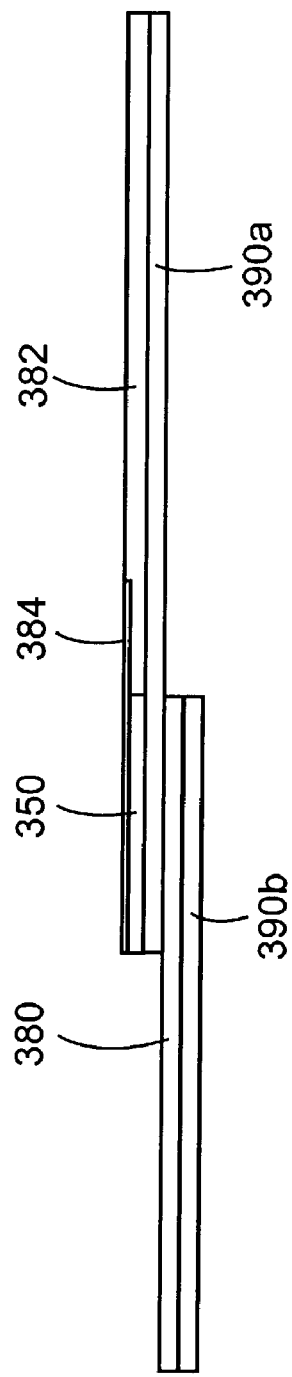
FIGS. 11A and 11B illustrate yet another embodiment of a combined display/power coupling electrode design.
Figure 11B:
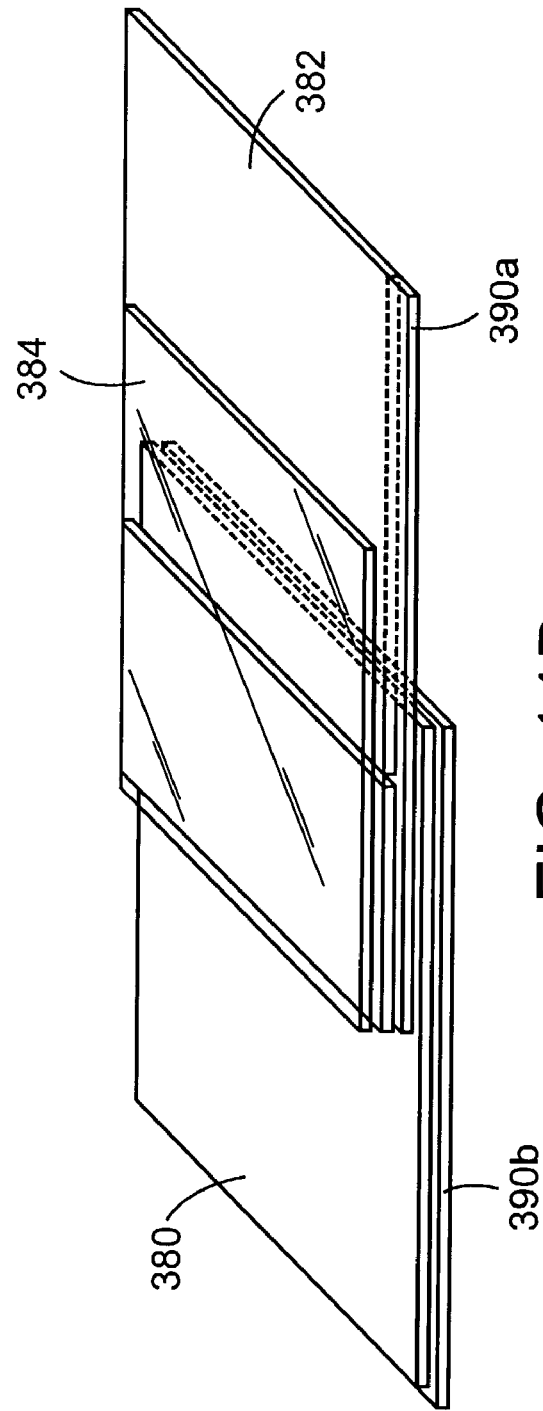

A further combined display/power coupling electrode design using metalized paper or foil laminate is shown in FIGS. 11A-11B. The arrangement in the embodiment of FIGS. 11A and 11B starts as an electrically insulated substrate including overlapping portions 390a, 390b made from materials such as paper, paperboard or thin polymer such as polyester sheet. Two electrically separated electrodes 380 and 382 are formed on the surface of the insulated substrate portions 390a and 390b, either by coating or lamination. Various methods can be used to form this embodiment such as by coating or laminating the entire surface and then electrically insulating the electrodes by selective removal of the conductive coatings or laminates. The sheets formed by insulating substrate portions 390a, 390b with electrodes 382, 380 formed on them by metalized or conductive coatings can be overlapped to create a seam. A portion of the electrode 382 is then removed from the area over the overlapped seam and in its place electrophoretic capsules 350 are printed to form the desired display. A transparent conductor 384 made from materials such as polypyrole, polyvinlylene or Indium Tin Oxide are coated over the electrophoretic microspheres 350 to complete the capacitive couplings.

Yet another embodiment of a combined display/power coupling design using transparent electrodes and substrates is shown in FIGS. 12A and 12B. The embodiment of FIGS. 12A and 12B starts as an electrically insulated lower substrate 490b made from materials such as paper, paperboard or thin polymer such as a polyester sheet. The insulating substrate 490b is then coated with a metalized or conductive coating 480 to form a first electrode. A thin layer of electrophoretic capsules can then be printed on a portion of the first electrode 480 to form display portions 450a and 450b. The display portion 450b can formed over the ends of at least first electrode 480 to ensure that the electrode 480 does not short out to upper electrode 484. A second transparent substrate 490a can be formed with a transparent semiconductor such as polyester 484 coated on its bottom face. The resulting sheets can then be overlapped to create a seam with the electrophoretic capsules 450a, 450b positioned between the two electrodes, thereby electrically the isolating the two sheets.

A further embodiment of a combined display/power coupling with a high resolution electrode design is shown in FIGS. 13A-13B. The package support system can include a transparent front electrode arranged as shown in FIGS. 13A and 13B, or in alternative arrangements such as electrode 167 shown in FIG. 8. The transparent front electrode 560 can be provided with an active matrix of electrode segments 560a, 560b, 560c etc. formed in a desired arrangement to produce a controlled image. Although not shown in FIGS. 13A and 13B, the package support system electrode 560 is generally sandwiched in between two insulating materials, which would also be transparent materials. A paperboard package 590 can be coated with a metalized or conductive coating 580 to form an electrode on the package. Electrophoretic materials or other electric field sensitive materials can then be coated over the conductive coating 580 to form the display 550. The electrophoretic materials of display 550 would generally be coated with a transparent insulating material to prevent unintentional shorting. In the embodiment of FIGS. 13A and 13B the electric field for controlling the display is generated directly across the electrophoretic materials between the shelf electrode 560 and package electrode 580, thereby requiring only one on-package electrode to create a capacitive coupling and drive the display.

Figure 8:
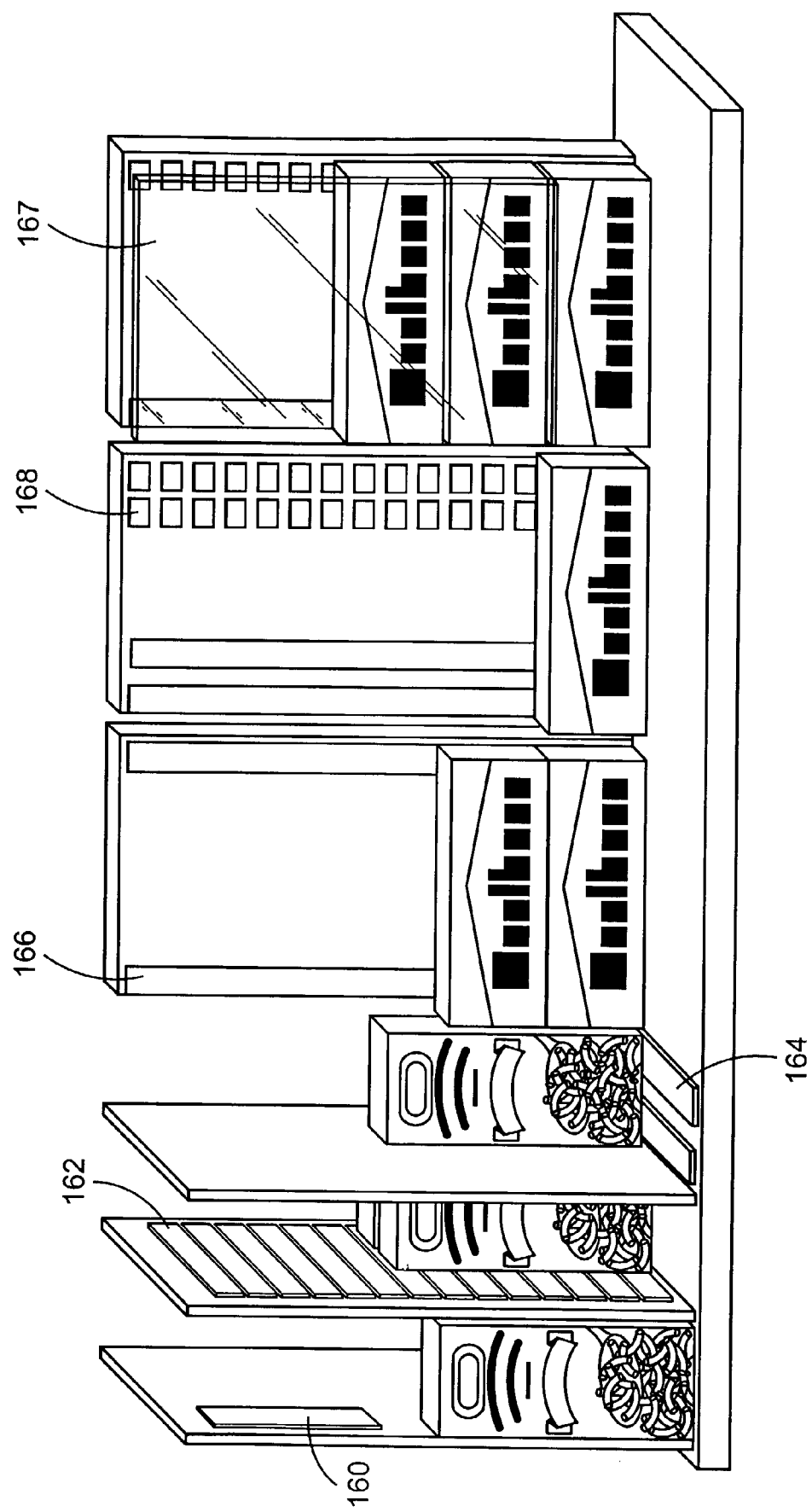
FIG. 8 illustrates a variety of shelf-powered fixtures.

Although a number of embodiments of combined display/power couplings and separate display and power couplings have been shown and described, the invention is not limited to the described embodiments, and can encompass other arrangements within the scope of the attached claims. On-package electrodes or electrically conductive regions and display materials can be made from a variety of materials including, but not limited to conventional metals and conductive polymers. Similarly, the insulating regions can be formed using a variety of insulating materials such as polymers including polyester, polyethylene, polypropylene etc. Any suitable process can be used for applying the conductive and insulating materials to the package such as coating and lamination, or the packaging materials themselves can be formed into the desired conductive regions and insulating regions. The on-package electrodes and package support electrodes are arranged so that placement of a package on a package support results in the desired coupling of power, data and/or signals from a power, data and/or signal distribution system located at least partially on the package support system to an on-package display or other sensory output device. The package support or shelf electrodes can also be positioned in various arrangements on the shelf, such as shown in FIG. 8, or in a one-dimensional array such that as a package is removed from the shelf, corresponding package electrodes pass by the shelf electrodes and are sequentially coupled to create a two-dimensional display on the package. Packages can also be provided with conductive electrodes such as rings around their perimeters so that stacked packages conduct power, data and/or signals from one package in proximity to shelf electrodes to other more distant packages. High resolution electrode designs such as the active matrix transparent electrode shown in FIGS. 13A and 13B could also be controlled in real time by a potential customer such as through the use of a digital camera or video camera that conveys the customer's image through the controlled array of electrodes to reproduce the customer's image on the package. If desired, the on-package display can be designed to retain the customer's image when the package is removed from the shelf, such as through the use of bistable electrophoretic materials in the display.

The invention claimed is:

1. A system for controlling an on-package electronic device, comprising:
   a power and/or signal distribution device positioned at least partially on a shelving unit; and
   a package having an electronic device and an image display on a surface of the package, said electronic device being activated and displaying images on the image display when said package is positioned on said shelving unit;
   wherein said package includes at least one packaging material that is electrically connected to said electronic device, said packaging material acting as a coupling medium for contactless coupling of said electronic device with said power and/or signal distribution device when said package is on said shelving unit; and wherein said packaging material forms at least part of a capacitor for capacitive coupling of said power and/or signal distribution device with said electronic device.

2. The system according to claim 1, wherein the image display is an electronically powered display, and wherein power for the display is provided remotely by the power distribution device and/or signal for the display is provided remotely by the signal distribution device.

3. The system according to claim 1, wherein the power and/or signal distribution device comprises a pulse generator, and/or wherein the shelving unit comprises a merchandise shelving unit, and/or wherein the package comprises a retail consumer package, and/or wherein the image display comprises an electrophoretic display.

4. A merchandising system, comprising:
  a power and/or signal distribution device provided in conjunction with a package support system;
  a package physically separated from the power and/or signal distribution device having a sensory output device capable of using power and/or signals provided remotely from said power and/or signal distribution device to produce a desired output when said package is on said package support system;
  wherein said package includes at least one packaging material that is electrically connected to said sensory output device, said packaging material acting as a coupling medium for contactless coupling of said sensory output device with said power and/or signal distribution device when said package is on said package support system; and
  wherein said packaging material forms at least part of a capacitor for capacitive coupling of said power and/or signal distribution device with said sensory output device.

5. The merchandising system according to claim 4, wherein:
  said sensory output device includes one or more electric field sensitive materials.

6. The merchandising system according to claim 4, wherein:
  all power to the package is provided remotely from said package support system.

7. The merchandising system according to claim 6, wherein:
  said desired output is varied by said sensory output device in conjunction with remotely-controlled variations in said power and/or signal distribution device when said package is placed on said package support means.

8. The merchandising system according to claim 7, wherein:
  said desired output includes a visual output that remains fixed after said package is removed from said package support system.

9. The merchandising system according to claim 4, further including:
  a second package having a sensory output device capable of using power and/or data provided from said power and/or signal distribution device to produce a desired output when said second package is placed on said package support system, said second package sensory output device producing a second desired output when said second package is placed adjacent said package.

10. The merchandising system according to claim 9, wherein: said second desired output is produced for a predetermined period of time when said second package is placed adjacent said package and said package and said second package are removed from said package support system.

11. The merchandising system according to claim 4, wherein:
  said package includes conductive and insulating portions forming a capacitOr for capacitively coupling said sensory output device to said power and/or signal distribution device when said package is placed on said package support system.

12. The merchandising system according to claim 11, further including a controller for remotely varying said power and/or signal distribution device to change the output of said sensory output device.

13. The merchandising system according to claim 4, wherein:
  said power and/or signal distribution device includes electrodes mounted on said package support system; and said package includes one or more electric field sensitive materials.

14. The merchandising system according to claim 4, wherein the power and/or signal distribution device comprises a pulse generator, and/or wherein the package support system comprises a merchandise shelving unit, and/or wherein the package comprises a retail consumer package, and/or wherein the sensory output device comprises an electrophoretic display.

15. The merchandising system according to claim 4, wherein:
  a visual output from the sensory output device remains fixed after said package is removed from said package support system.

* * * * *